United States Patent
Lan et al.

(10) Patent No.: US 11,487,360 B1
(45) Date of Patent: Nov. 1, 2022

(54) GAZE TRACKING METHOD AND GAZE TRACKING DEVICE USING IHE SAME

(71) Applicant: INDUSTRIAL TECHNOLOGY RESEARCH INSTITUTE, Hsinchu (TW)

(72) Inventors: Yu-Ying Lan, Hsinchu (TW); Jui-Feng Huang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 17/562,652

(22) Filed: Dec. 27, 2021

(30) Foreign Application Priority Data

Dec. 21, 2021 (TW) .................................. 110147911

(51) Int. Cl.
    *G06F 3/01*    (2006.01)
    *G06V 40/16*   (2022.01)
    *G06V 40/18*   (2022.01)

(52) U.S. Cl.
    CPC ............ *G06F 3/013* (2013.01); *G06V 40/166* (2022.01); *G06V 40/169* (2022.01); *G06V 40/18* (2022.01)

(58) Field of Classification Search
    CPC .... G06F 3/013; G06V 40/166; G06V 40/169; G06V 40/18
    See application file for complete search history.

(56) References Cited

U.S. PATENT DOCUMENTS

| 2015/0135309 | A1  | 5/2015  | Karmarkar et al. |
| 2015/0293588 | A1* | 10/2015 | Strupczewski ......... G06F 3/012 382/117 |
| 2016/0202756 | A1* | 7/2016  | Wu ....................... G06F 3/0304 382/103 |

(Continued)

FOREIGN PATENT DOCUMENTS

| CN | 106529409 A | 3/2017 |
| CN | 102830793 B | 4/2017 |
| CN | 113343879 A | 9/2021 |

(Continued)

OTHER PUBLICATIONS

Taiwanese Office Action and Search Report for corresponding Taiwanese Application No. 110147911, dated Jul. 18, 2022.

*Primary Examiner* — Abhishek Sarma
(74) *Attorney, Agent, or Firm* — Birch, Stewart, Kolasch & Birch, LLP

(57) ABSTRACT

A gaze tracking method includes the following steps. Firstly, a to-be-analyzed facial image is captured. Then, whether the to-be-analyzed facial image conforms to a customized 3D face model is determined If not, a customized 3D face model of the to-be-analyzed facial image is created. If yes, an eye area image of the to-be-analyzed facial image is obtained. Then, according to the customized 3D face model and the to-be-analyzed facial image, head posture information is obtained. Then, an eye camera coordinate value referenced to a camera coordinate system is obtained. Then, the eye camera coordinate value is converted into an eye frame coordinate value referenced to a display frame coordinate system. Then, according to the eye frame coordinate value, the head posture information and an eyeball radius, an eyeball center point coordinate value is obtained, and accordingly a gaze coordinate value is obtained.

18 Claims, 10 Drawing Sheets

(56) References Cited

U.S. PATENT DOCUMENTS

2016/0210503 A1* 7/2016 Yin .......................... G06T 7/73
2021/0374994 A1 12/2021 Lu et al.

FOREIGN PATENT DOCUMENTS

| TW | I585607 B | 6/2017 |
| TW | I637288 B | 10/2018 |
| TW | 202013244 A | 4/2020 |

* cited by examiner

GAZE TRACKING METHOD AND GAZE TRACKING DEVICE USING THE SAME

This application claims the benefit of Taiwan application Serial No. 110147911, filed Dec. 21, 2021, the subject matter of which is incorporated herein by reference.

TECHNICAL FIELD

The disclosure relates in general to a gaze tracking method and a gaze tracking device using the same.

BACKGROUND

Gaze tracking systems have been widely applied in medical, retail, human-machine interface and game fields due to improvement and parity of technology. However, in order to achieve high precision, most systems include quite complex and personalized correction procedures and thus it is quite inconvenient to use. Therefore, how to propose a new technology that could improve the aforesaid problems is the goal of continuous efforts of those skilled in the art.

SUMMARY

According to an embodiment, a gaze tracking method is provided. The gaze tracking method includes the following steps: capturing, by a camera, a to-be-analyzed image, wherein the to-be-analyzed image includes a to-be-analyzed facial image of a face of a photographed person; determining whether the to-be-analyzed facial image of the to-be-analyzed image conforms to a customized 3D face model; establishing the customized 3D face model of the to-be-analyzed facial image through a customized 3D face modeling process if the to-be-analyzed facial image of the to-be-analyzed image does not conform to the customized 3D face model; obtaining an eye region image of the to-be-analyzed facial image if the to-be-analyzed facial image of the to-be-analyzed image conforms to the customized 3D face model; obtaining a head posture information of a head of the photographed person according to the customized 3D face model and the to-be-analyzed facial image; obtaining an eye camera coordinate value of an eye characteristic point of the eye region image, wherein the eye camera coordinate value is referenced to a camera coordinate system; converting the eye camera coordinate value into an eye frame coordinate value, wherein the eye frame coordinate value is referenced to a display frame coordinate system; obtaining an eyeball center point coordinate value of the photographed person according to the eye frame coordinate value, the head posture information and an eyeball radius; and obtaining a gaze projection point coordinate value of the photographed person according to the eye frame coordinate value and the eyeball center point coordinate value.

According to another embodiment, a gaze tracking device is provided. The gaze tracking device includes a display, a camera, a determination unit, a modeling unit and an analysis unit. The camera is disposed on the display and configured for capturing a to-be-analyzed image, wherein the to-be-analyzed image includes a to-be-analyzed facial image of a face of a photographed person. The determination unit is configured for determining whether the to-be-analyzed facial image of the to-be-analyzed image conforms to a customized 3D face model. The modeling unit is configured for establishing the customized 3D face model of the to-be-analyzed facial image through a customized 3D face modeling process if the to-be-analyzed facial image of the to-be-analyzed image does not conform to the customized 3D face model. The analysis unit is configured for obtaining an eye region image of the to-be-analyzed facial image if the to-be-analyzed facial image of the to-be-analyzed image conforms to the customized 3D face model; obtaining a head posture information of a head of the photographed person according to the customized 3D face model and the to-be-analyzed facial image; obtaining an eye camera coordinate value of an eye characteristic point of the eye region image, wherein the eye camera coordinate value is referenced to a camera coordinate system; converting the eye camera coordinate value into an eye frame coordinate value, wherein the eye frame coordinate value is referenced to a display frame coordinate system; obtaining an eyeball center point coordinate value of the photographed person according to the eye frame coordinate value, the head posture information and an eyeball radius; and obtaining a gaze projection point coordinate value of the photographed person according to the eye frame coordinate value and the eyeball center point coordinate value.

The above and other aspects of the disclosure will become better understood with regard to the following detailed description of the preferred but non-limiting embodiment(s). The following description is made with reference to the accompanying drawings.

Figure 1:
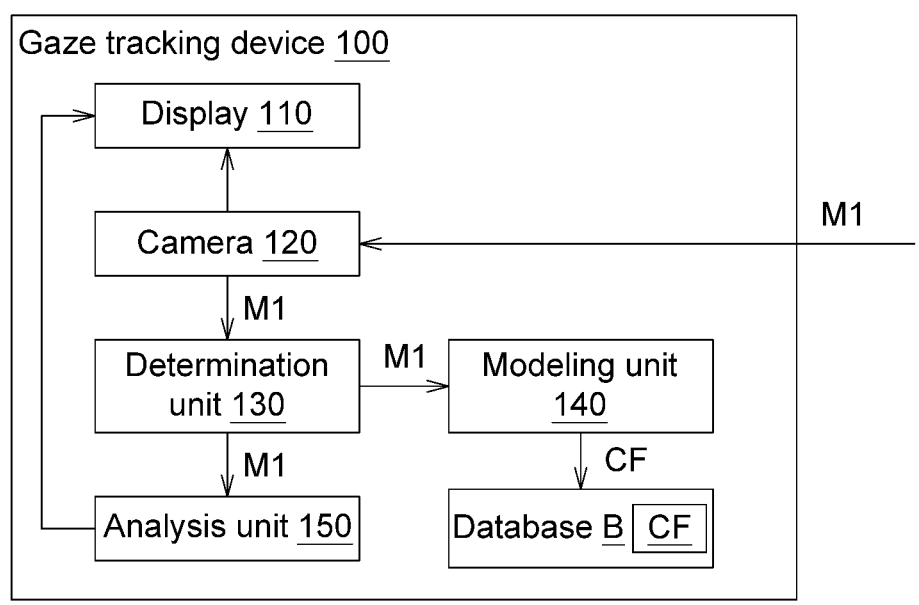
FIG. 1 is a schematic diagram of a gaze tracking device according to an embodiment of the present disclosure.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 2:
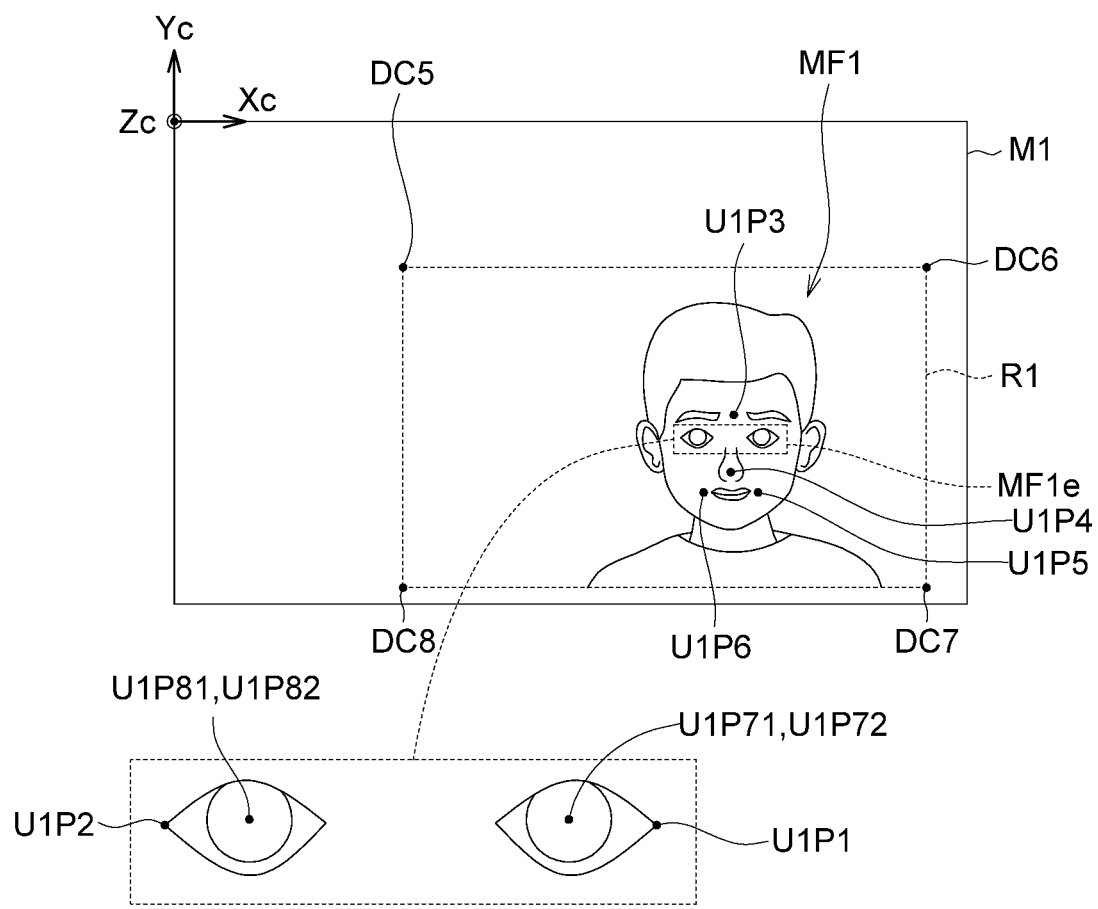
FIG. 2 is a schematic diagram of a to-be-analyzed camera image captured by the camera of FIG. 1.

Referring to FIGS. 1 to 3C. FIG. 1 is a schematic diagram of a gaze tracking device 100 according to an embodiment of the present disclosure, FIG. 2 is a schematic diagram of a to-be-analyzed camera image M1 captured by the camera 120 of FIG. 1, and FIGS. 3A to 3C are schematic diagrams of the photographed U1 and the camera 120 of FIG. 1 at different viewing angles.

As shown in FIGS. 1 and 2, the gaze tracking device 100 includes a display 110, a camera 120, a determination unit 130, a modeling unit 140 and an analysis unit 150. At least two of the determination unit 130, the modeling unit 140 and the analysis unit 150 could be integrated into a single unit. Alternatively, at least one of the determination unit 130, the modeling unit 140 and the analysis unit 150 could be integrated into a processor or a controller. The determination unit 130, the modeling unit 140 and/or the analysis unit 150 are, for example, software, firmware or hardware. At least one of the determination unit 130, the modeling unit 140 and/or the analysis unit 150 is a physical circuit formed by, for example, a semiconductor process.

Figure 3A:
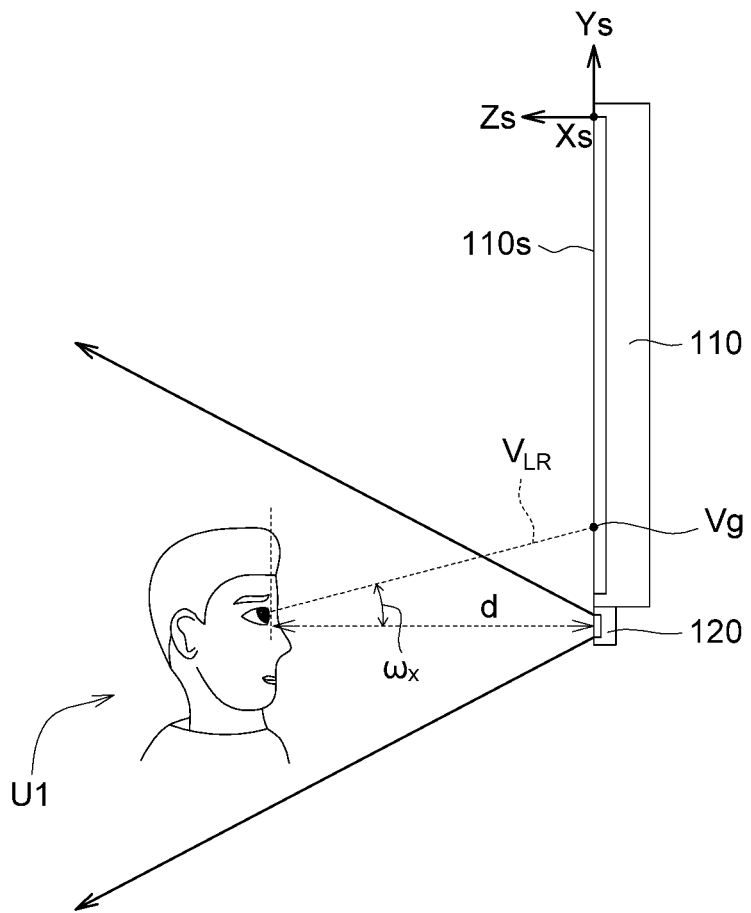
FIGS. 3A to 3C are schematic diagrams of the photographed and the camera of FIG. 1 at different viewing angles.
Figure 3B:
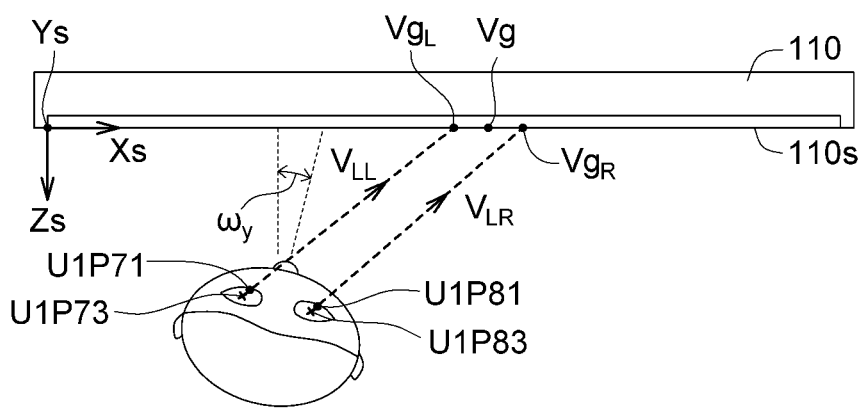
Figure 3C:
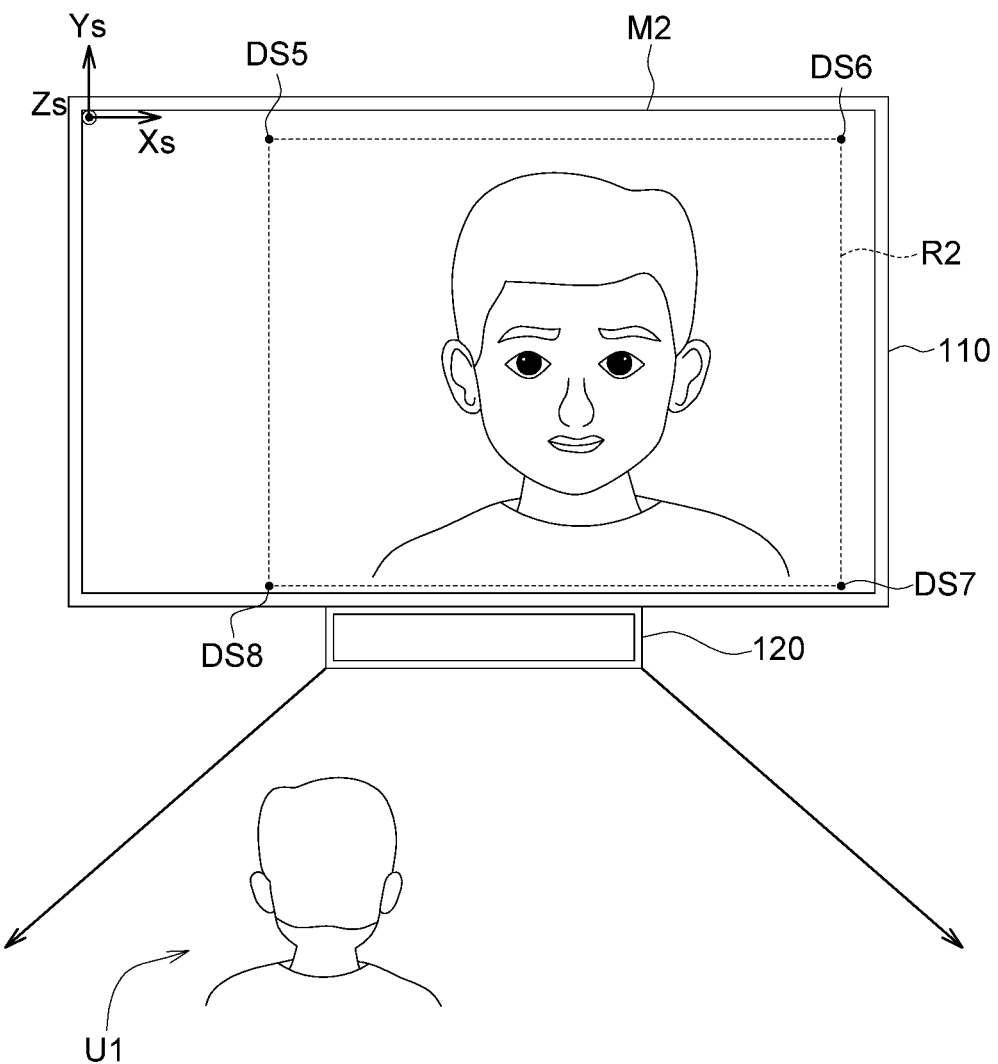

The camera 120 is disposed on the display 110 and is configured for capturing a to-be-analyzed image M1, and the to-be-analyzed image M1 includes a to-be-analyzed facial image MF1 of a face of the photographed U1. The determination unit 130 is configured to determine whether the to-be-analyzed facial image MF1 conforms to a customized three-dimensional (3D) face model CF. The modeling unit 140 is configured for establish the customized 3D face model CF of the to-be-analyzed facial image MF1 through a customized 3D face modeling process if the to-be-analyzed facial image MF1 does not conform to the customized 3D facial model CF. The analysis unit 150 is configured to (1) obtain an eye region image MF1e of the to-be-analyzed facial image MF1 if the to-be-analyzed facial image MF1 conforms to the customized 3D facial model CF; (2). obtain a head posture information of a head of the to-be-analyzed facial image MF1 (for example, a up-and-down tilt angle $\omega_x$ of the head of the photographed U1 in FIG. 3A and a left-and-right tilt angle $\omega_y$ of the head of the photographed U1 in in FIG. 3B according to the customized 3D face model CF and to-be-analyzed facial image MF1; (3). obtain at least one eye camera coordinate value (for example, the eye camera coordinate value of a pupil center point U1P71 and the eye camera coordinate value of an eye center point U1P72 of a left eye in FIG. 2, and the eye camera coordinate value of a pupil center point U1P81 and the eye camera coordinate value of an eye center point U1P82 of a right eye in FIG. 2), wherein the eye camera coordinate value refers to a camera coordinate system Xc-Yc-Zc; (4). convert the eye camera coordinate value of the eye into an eye frame coordinate value of the eye, wherein the eye frame coordinate value refers to a display frame coordinate system Xs-Ys-Zs (the display frame coordinate system Xs-Ys-Zs are shown in FIGS. 3A to 3C); (5). obtain at least one eyeball center point coordinate value of the photographed U1 (for example, a coordinate of an eyeball center point U1P73 of the left eye of and a coordinate of an eyeball center point U1P83 of the right eye) according to the eye frame coordinate value and an eyeball radius $R_{EB}$ of the eye; and (6). obtain a gaze (or line-of-sight) projection point $V_g$ (the gaze projection point Vg is shown FIG. 3) of the photographed according to the eye camera coordinate value of the eye and the coordinate value of the eye center point.

After obtaining the gaze projection point $V_g$, the display 110 could display the gaze projection point $V_g$ to display the latest gaze dynamic of the photographed U1.

Since the customized 3D face model CF is a customized face model for the photographed person U1, the gaze projection point $V_g$ of the to-be-analyzed facial image MF1 obtained by the gaze tracking device 100 has high precision and accuracy (that is, the gaze projection point $V_g$ obtained by the gaze tracking device 100 is equivalent to an actual gaze point of the photographed person U1), and if the photographed person U1 has not established the customized 3D face model CF, the gaze tracking device 100 would also actively establish the customized 3D face model CF exclusive to the photographed person U1.

The following describes the gaze tracking method of the gaze tracking device 100.

Figure 4:
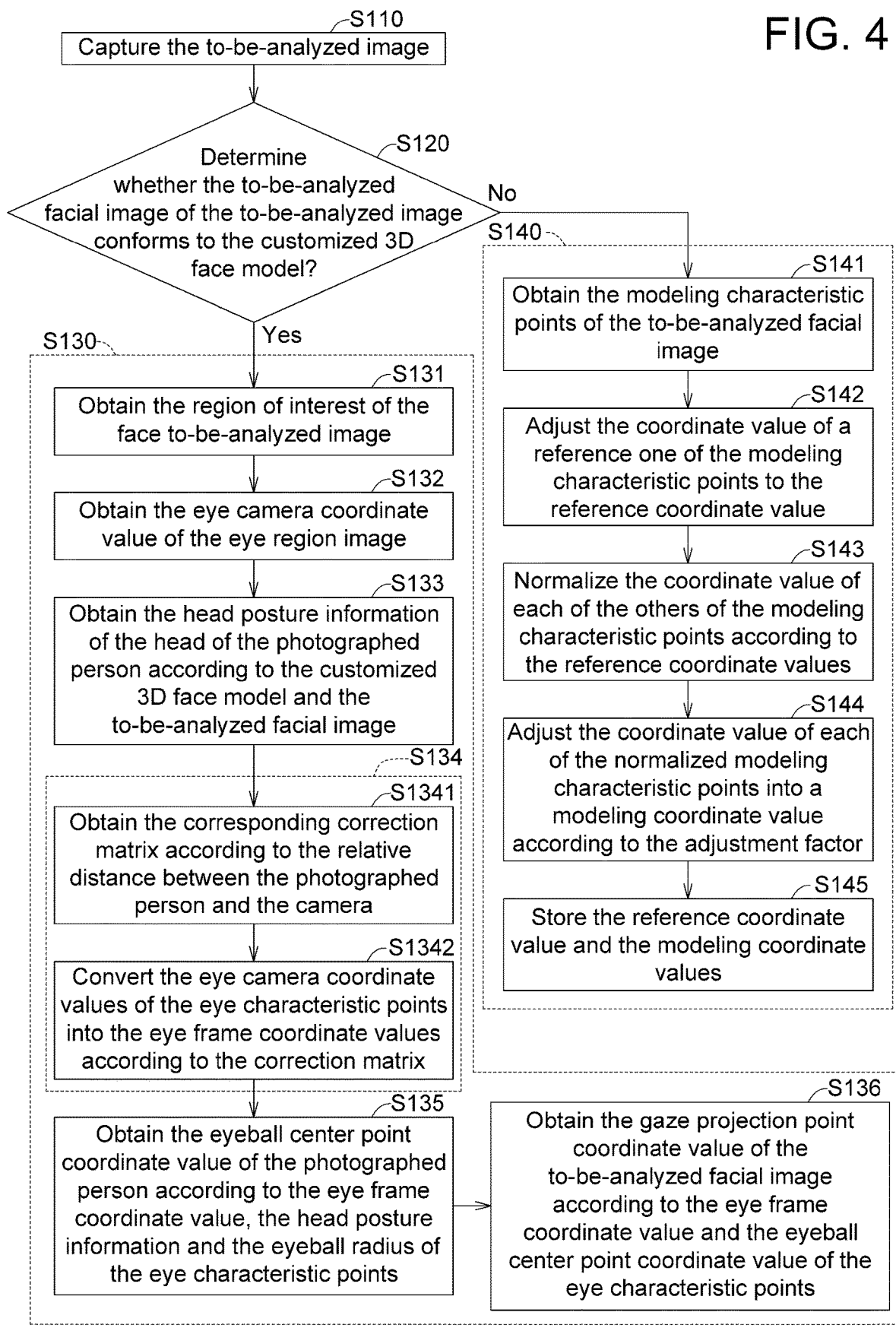
FIG. 4 is a flowchart of a gaze tracking method of the gaze tracking device of FIG. 1.

Referring to FIGS. 4 and 5A to 5C. FIG. 4 is a flowchart of a gaze tracking method of the gaze tracking device 100 of FIG. 1, and FIGS. 5A to 5C are the schematic diagrams of processes of establishing the to-be-analyzed facial image MF1 of FIG. 2.

In step S110, as shown in FIG. 2, the camera 120 captures the to-be-analyzed image M1, wherein the to-be-analyzed image M1 includes the to-be-analyzed facial image MF1 of the face of the photographed person U1 (the photographed person U1 is shown in FIG. 3A).

In step S120, the determination unit 130 determines whether the to-be-analyzed facial image MF1 of the to-be-analyzed image M1 conforms to the customized 3D face model CF. If the to-be-analyzed facial image MF1 of the to-be-analyzed image M1 conforms to the customized 3D face model CF, the process proceeds to step S130 to obtain the gaze projection point $V_g$ of the to-be-analyzed facial image MF1. If the to-be-analyzed facial image MF1 of the to-be-analyzed image M1 does not conform to the customized 3D face model CF, the process proceeds to step S140 to establish the customized 3D face model CF of the to-be-analyzed facial image MF1.

For example, as shown in FIG. 2, the determination unit 130 could analyze several characteristic points of the to-be-analyzed facial image MF1, such as 68 characteristic points, at least including a left eye corner point U1P1, a right eye corner point U1P2, a middle point U1P3 between two eyebrows, a nose tip point U1P4, a left mouth corner point U1P5, a right mouth corner point U1P6, a pupil center point U1P71 and an eye center point U1P72 of the left eye and a pupil center point U1P81 and an eye center point U1P82 of right eye of FIG. 2, etc., wherein whether the to-be-analyzed facial image MF1 conforms to the customized 3D face model CF is to determined according to the left eye corner point U1P1, the right eye corner point U1P2, the middle point U1P3 between two eyebrows, the nose tip point U1P4, the left mouth corner point U1P5 and the right mouth corner point U1P6. If the left eye corner point U1P1, the right eye corner point U1P2, the middle point U1P3 between two eyebrows, the nose tip point U1P4, the left mouth corner point U1P5 and the right mouth corner point U1P6 of the to-be-analyzed facial image MF1 do not meet all the six characteristic points of the customized 3D face model CF, and it means that the customized 3D face model CF has not yet been established by the photographed person U1, and the process proceeds to step S140 to establish the customized 3D face model CF exclusive to the photographed person U1. If the left eye corner point U1P1, the right eye corner point U1P2, the middle point U1P3 between two eyebrows, the nose tip point U1P4, the left mouth corner point U1P5 and the right mouth corner point U1P6 of the to-be-analyzed facial image MF1 meet all the six characteristic points of the customized 3D face model CF, it means that the photographed person U1 has previously established the customized 3D face model CF, and the process proceeds to step S130 to obtain the gaze projection point Vg of the photographed person U1.

The following describes the customized 3D face modeling process (step S140).

The customized 3D face modeling process could be implemented by various implementations, one of which is described below with the processes of FIG. 4.

Figure 5A:
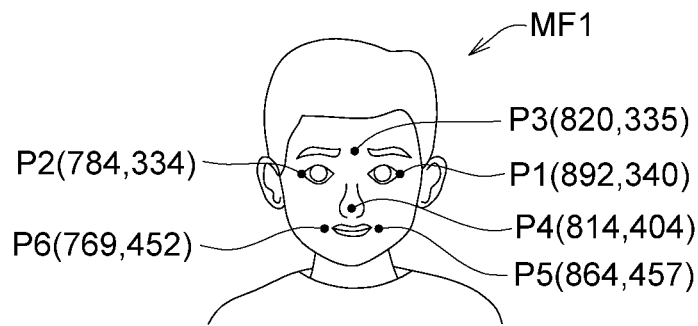
FIGS. 5A to 5C are the schematic diagrams of processes of establishing the to-be-analyzed facial image of FIG. 2.

In step S141, the modeling unit 140 obtains several characteristic points of the to-be-analyzed facial image MF1, for example, the modeling characteristic points P1 to P6 of FIG. 5A, wherein the modeling characteristic point P1 is the left eye corner point of the to-be-analyzed facial image MF1, the modeling characteristic point P2 is the right eye corner point, the modeling characteristic point P3 is the middle point between two eyebrows, the modeling characteristic point P4 is the nose tip point, and the modeling characteristic point P5 is the left mouth corner point and the modulo characteristic point P6 is the right mouth corner point. The coordinate values of the modeling characteristic points P1 to P6 are merely examples, and the coordinate values are also different for different photographed person with different facial geometry. Furthermore, the modeling characteristic points are not limited to the aforementioned facial features, but could be characteristic points of any part of the face.

Figure 5B:

In step S142, as shown in FIG. 5B, the modeling unit 140 adjusts the coordinate value of a reference one of the modeling characteristic points P1-P6 to a reference coordinate value. For example, the modeling unit 140 uses the modeling characteristic point P4 (the nose tip point) as a reference one and adjusts the coordinate value of the reference one to the reference coordinate value, for example, (0, 0).

In step S143, as shown in FIG. 5B, the modeling unit 140 normalizes the coordinate value of each of the others of the modeling characteristic points P1-P6 according to the reference coordinate values. For example, the modeling unit 140 adjusts the coordinate values of the other modeling characteristic points P1-P3 and P5-P6 of the modeling characteristic points P1-P6 with the reference coordinate value as the center. Before and after the adjusting, the relative distance between the modeling characteristic points P1-P6 remains fixed (unchanged). The coordinate values of the normalized modeling characteristic points P1-P3 and P5-P6 are shown in FIG. 5B, but such numerical values are not meant to be for limiting.

Figure 5C:
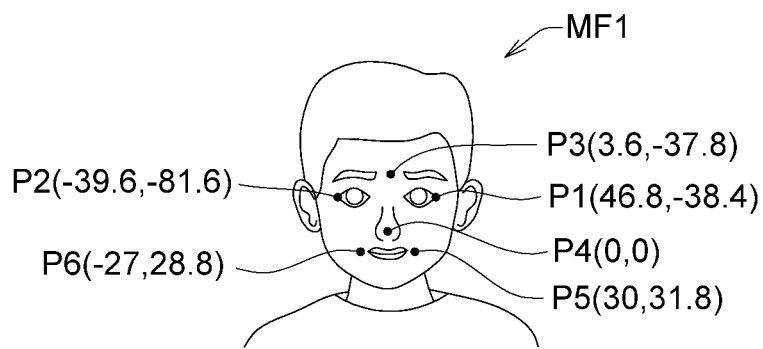

In step S144, as shown in FIG. 5C, the modeling unit 140 adjusts the coordinate value of each of the normalized modeling characteristic points P1-P3 and P5-P6 into a modeling coordinate value according to an adjustment factor N1. For example, the modeling unit 140 obtains the product of the coordinate value of each of the normalized modeling characteristic points P1-P3 and P5-P6 and the adjustment factor N1 and uses the value of the product as the modeling coordinate value. The adjusted modeling coordinate values of the modeling characteristic points P1-P3 and P5-P6 are shown in FIG. 5C, but the values are only examples and such numerical values are not meant to be for limiting. In the present embodiment, the adjustment factor N1 is, for example, an integer, such as an integer between 0.1 and 1.0, such as 0.6 or other values. The value of the adjustment factor N1 is determined according to the resolution and/or the relative distance of the camera, and it is not limited by the embodiments of the present disclosure.

In an embodiment, the modeling unit 140 obtains the corresponding adjustment factor N1 according to the relative distance d between the photographed person U1 and the display 110. The value of the adjustment factor N1 could be proportional to the relative distance d. The unit of the adjustment factor N1 is, for example, length/per pixel (for example, mm/pixel). When the relative distance d becomes larger, it means that the actual size (corresponding to the photographed person) represented by each pixel becomes larger, the value of the adjustment factor N1 also becomes larger to reflect that the pixel size increases with the increase of the relative distance. Conversely, when the relative distance d becomes smaller, it means that the actual size (corresponding to the photographed person) represented by each pixel becomes smaller, the value of the adjustment factor N1 also becomes smaller to reflect that the pixel size reduces with the reduction of the relative distance.

In addition, the aforementioned relative distance d could be detected by the camera 120. The camera 120 is, for example, a Time of Flight (ToF) camera. Alternatively, the camera 120 includes at least two image sensors, and these image sensors could use conventional image processing technique to calculate the detected image signal to obtain the relative distance d. Alternatively, the camera 120 could obtain the relative distance d through the principle of pinhole imaging and the focal length of the camera.

In step S145, the modeling unit 140 stores the reference coordinate value of the reference one and the modeling coordinate value of each of the other modeling characteristic points P1-P3 and P5-P6 of the modeling characteristic points P1-P6 as the customized 3D face model CF exclusive to the photographed person U1 of the to-be-analyzed facial image MF1. The customized 3D face model CF could be stored in database B (shown in FIG. 1).

The process of obtaining the gaze projection point (step S130) will be described below.

The process of obtaining the gaze projection point could be implemented by various implementations, one of which is described below with reference to step S130 in FIG. 4.

In step S131, the analysis unit 150 obtains the region of interest (ROI) of the face to-be-analyzed image MF1, for example, the eye region image MF1e of FIG. 2.

In step S132, as shown in FIG. 2, the analysis unit 150 obtains the eye camera coordinate value of at least one eye characteristic point of the eye region image MF1e. The eye characteristic points are, for example, the pupil center point and the eye center point, such as the pupil center point U1P71 and the eye center point U1P72 of the left eye and the pupil center point U1P81 and the eye center point U1P82 of the right eye. The eye center point here represents the center point of the eyeball surface of the eye region image MF1e. When the eye looks straight, the pupil center point is substantially coincident with the eye center point. When the eye oblique views, the pupil center point and the eye center point are staggered (that is, not coincides with each other). In addition, the pupil center point U1P71 of the left eye has the coordinate value $(x_{EP}', y_{EP}')$, the eye center point U1P72 of the left eye has the coordinate value $(x_{EC}', y_{EC}')$, and the pupil center point U1P81 of the right eye has the coordinate value $(x_{EP}', y_{EP}')$, and the eye center point U1P82 of the right eye has the coordinate value $(x_{EC}', y_{EC}')$.

In step S133, as shown in FIG. 2, the analysis unit 150 obtains the head posture information of the head of the photographed person U1 according to the customized 3D face model CF (shown in FIG. 1) and the to-be-analyzed facial image MF1 exclusive to the photographed person U1, wherein the head posture information includes, for example, the up-and-down tilt angle $\omega_x$ and the left-and-right tilt angle $\omega_y$ of the head of the photographed person U1 of FIG. 3A, wherein the up-and-down tilt angle $\omega_x$ is an included angle of the head relative to a horizontal axis (for example, axis $X_s$), or a rotation angle of the head around the axis $X_s$, and the left-and-right tilt angle $\omega_y$ is an included angle of the head relative to a vertical axis (for example, axis $Y_s$), or a rotation angle of the head around the axis $Y_s$. Furthermore, when the relative positions between the six characteristic points U1P1 to U1P6 of the to-be-analyzed facial image MF1 and the six modeling characteristic points P1 to P6 of the corresponding customized 3D face model CF change, it means that the head posture of the photographed person U1 changes. The analysis unit 150 analyzes the difference by using the analysis technology of 3D head match based on the customized 3D face model, and obtains the head posture information of the head of the photographed person U1. However, as long as the up-and-down tilt angle $\omega_x$ and the left-and-right tilt angle $\omega_y$ could be obtained, the embodiment of the present disclosure does not limit the adopted algorithm and/or image processing technology.

In step S134, the analysis unit 150 converts the eye camera coordinate values of the eye characteristic points into the eye frame coordinate values, wherein the eye frame coordinate values refer to the display frame coordinate system Xs-Ys-Zs (the display frame coordinate system Xs-Ys-Zs is shown in FIG. 3A). Furthermore, the analysis unit 150 could convert the eye camera coordinate values of the eye characteristic points into the eye frame coordinate values by using the following formulas (1) and (2), wherein the eye frame coordinate values refer to the display frame coordinate system Xs-Ys-Zs, so that the coordinate system calculated by the following formulas (3) to (4B) could be referred to the display frame coordinate system Xs-Ys-Zs.

Step S134 could include the following steps S1341 and S1342.

In step S1341, the analysis unit 150 obtains (or generates) a correction matrix H corresponding to the relative distance d according to the relative distance d between the photographed person U1 and the camera 120 (the method for obtaining the correction matrix H will be described later). The correction matrix H is a coordinate transformation matrix of the camera coordinate system Xc-Yc-Zc and the display frame coordinate system Xs-Ys-Zs, and it could be obtained by using any suitable mathematical method (for example, vector coordinate transformation technology). The values of the elements h11 to h33 of the correction matrix H depend on the relative distance d, and the values of the elements h11 to h33 are not constant (non-fixed value).

In step S1342, the analysis unit 150 converts the eye camera coordinate values of the eye characteristic points into the eye frame coordinate values according to the correction matrix H. For example, after the correction matrix H is determined (or obtained), the eye camera coordinate value $(x_{EP}', y_{EP}')$ of the pupil center point is substituted into formula (1) to obtain the eye frame coordinate value $(x_{EP}, y_{EP})$ of the pupil center point, and the eye camera coordinate value $(x_{EC}', y_{EC}')$ of the eye center point is substituted into formula (2) to obtain the eye frame coordinate value $(x_{EC}, y_{EC})$ of the eye center point. The left eye and the right eye respectively have the eye frame coordinate value of the pupil center point and the eye frame coordinate value of the eye center point. Furthermore, the analysis unit 150 substitutes the eye camera coordinate value of the pupil center point U1P71 and the eye camera coordinate value of the eye center point U1P72 of the left eye into the following formulas (1) and (2) respectively, to obtain the corresponding eye frame coordinate values, and substitutes the eye camera coordinate value of the pupil center point U1P81 and the eye camera coordinate value of the eye center point U1P82 of the right eye into the following formulas (1) and (2) respectively, to obtain the corresponding eye frame coordinate values.

$$\begin{bmatrix} x_{EP} \\ y_{EP} \\ 1 \end{bmatrix} = H \times \begin{bmatrix} x_{EP'} \\ y_{EP'} \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_{EP'} \\ y_{EP'} \\ 1 \end{bmatrix} \quad (1)$$

$$\begin{bmatrix} x_{EC} \\ y_{EC} \\ 1 \end{bmatrix} = H \times \begin{bmatrix} x_{EC'} \\ y_{EC'} \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_{EC'} \\ y_{EC'} \\ 1 \end{bmatrix} \quad (2)$$

In addition, the eye frame coordinate value of the pupil center point could be written as $(x_{EP}, y_{EP}, z_{EP})$, wherein $x_{EP}$ and $y_{EP}$ are obtained from formula (1), and $z_{EP}$ is the value of the relative distance d, and the eye frame coordinate value of the eye center point could be written as $(x_{EC}, y_{EC}, z_{EC})$, wherein $x_{EC}$ and $y_{EC}$ are obtained from formula (2), and $z_{EC}$ is the value of the relative distance d.

In step S135, the analysis unit 150 obtains an eyeball center point coordinate value $(x_{EB}, y_{EB}, z_{EB})$ of the photographed person U1 according to the eye frame coordinate value, the head posture information and the eyeball radius $R_{EB}$, as shown in the following formula (3). The eyeball radius $R_{EB}$ of general adult eye is, for example, about 12 mm; however, such exemplification is not meant to be for limiting. The positive and negative values of formula (3) are defined by the swinging direction of the head. The eyeball center point coordinate value $(x_{EB}, y_{EB}, z_{EB})$ is referenced to the display frame coordinate system Xs-Ys-Zs (the display frame coordinate system Xs-Ys-Zs is shown in FIGS. 3A to 3C).

$$(x_{EB}, y_{EB}, z_{EB}) = (x_{EC} \pm |R_{EB} \cos \omega_x \sin \omega_y|, y_{EC} \pm |R_{EB} \cos \omega_y \sin \omega_x|, R_{EB} \cos \omega_x \cos \omega_y + z_{EC}) \quad (3)$$

In step S136, the analysis unit 150 obtains a gaze projection point coordinate value $(x_{IP}, y_{IP})$ of the photographed person U1 according to the eye frame coordinate value $(x_{EP}, y_{EP}, z_{EP})$ and the eyeball center point coordinate value $(x_{EB}, y_{EB}, z_{EB})$. The gaze projection point coordinate value $(x_{IP}, y_{IP})$ is the coordinate value of the coordinate point where he photographed person's gaze is projected on a display surface 110s (z=0). As shown in FIG. 3B, $V_{gR}$ is the gaze projection point of the gaze $V_{LR}$ of the right eye, and $V_{gL}$ is the gaze projection point of the gaze $V_{LL}$ of the left eye, wherein the gaze is the line connecting the center point of the pupil and the center point of the eyeball.

For example, the analysis unit 150 could substitute the eye frame coordinate values $(x_{EP}, y_{EP}, z_{EP})$ and the eyeball center point coordinate value $(x_{EB}, y_{EB}, z_{EB})$ of the pupil center point into the following formulas (4A) and (4B). The left eye and the right eye each has a corresponding group $(x_{IP}, y_{IP})$, the gaze projection point coordinate value $V_{gR}$ of the right eye is written as $(x_{IP}, y_{IP})_R$, and the gaze projection point coordinate value $V_{gL}$ of the left eye is written as $(x_{IP}, y_{IP})_L$.

$$x_{IP} = \frac{z_{EB}}{z_{EB} - z_{EP}}(x_{EP} - x_{EB}) + x_{EB} \quad (4A)$$

$$y_{IP} = \frac{z_{EB}}{z_{EB} - z_{EP}}(y_{EP} - y_{EB}) + y_{EB} \quad (4B)$$

The analysis unit 150 could obtain one gaze projection point coordinate value $V_g$ (shown in FIG. 3B) according to the gaze projection point coordinate value $V_{gR}(x_{IP}, y_{IP})_R$ of the right eye and the gaze projection point coordinate value $V_{gL}(x_{IP}, y_{IP})_L$ of the left eye. For example, the analysis unit 150 could obtain one gaze projection point coordinate value $V_g$ by taking an average value of the gaze projection point coordinate value $V_{gR}(x_{IP},y_{IP})_R$ and the gaze projection point coordinate value $V_{gL}(x_{IP},y_{IP})_L$.

Then, the display 110 could display the gaze projection point coordinate value $V_g$.

The following is an example to describe the method of obtaining the correction matrix H. Before obtaining the correction matrix H, a number of initial coordinate values of a number of object camera coordinate points DC1 to DC4 and a number of initial coordinate values of a number of object display coordinate points DS1 to DS4 are obtained first.

The following describes the process of obtaining the initial coordinate values of the object camera coordinate points and the initial coordinate values of the object display coordinate points.

Figure 6:
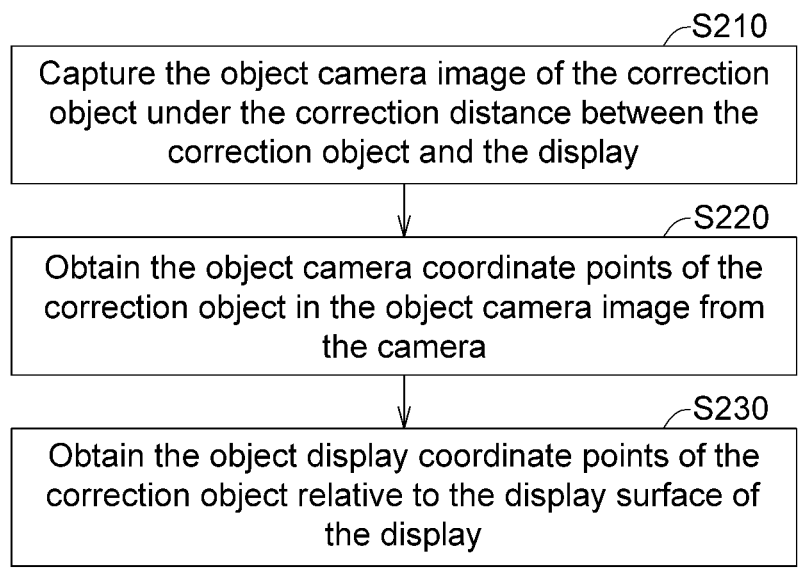
FIG. 6 is a flow chart of obtaining the initial coordinate values of the object camera coordinate points and the initial coordinate values of the object display coordinate points according to an embodiment of the present disclosure.
Figure 7A:
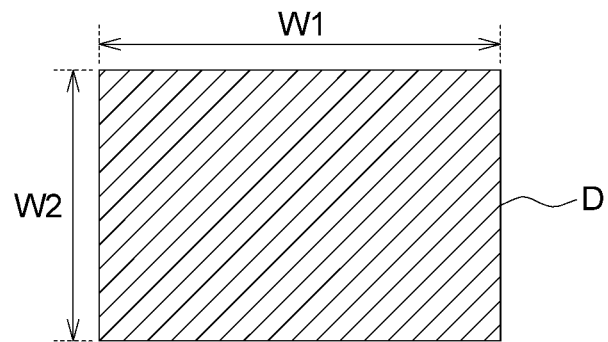
FIG. 7A is a schematic diagram of a correction object according to an embodiment of the present disclosure.
Figure 7B:
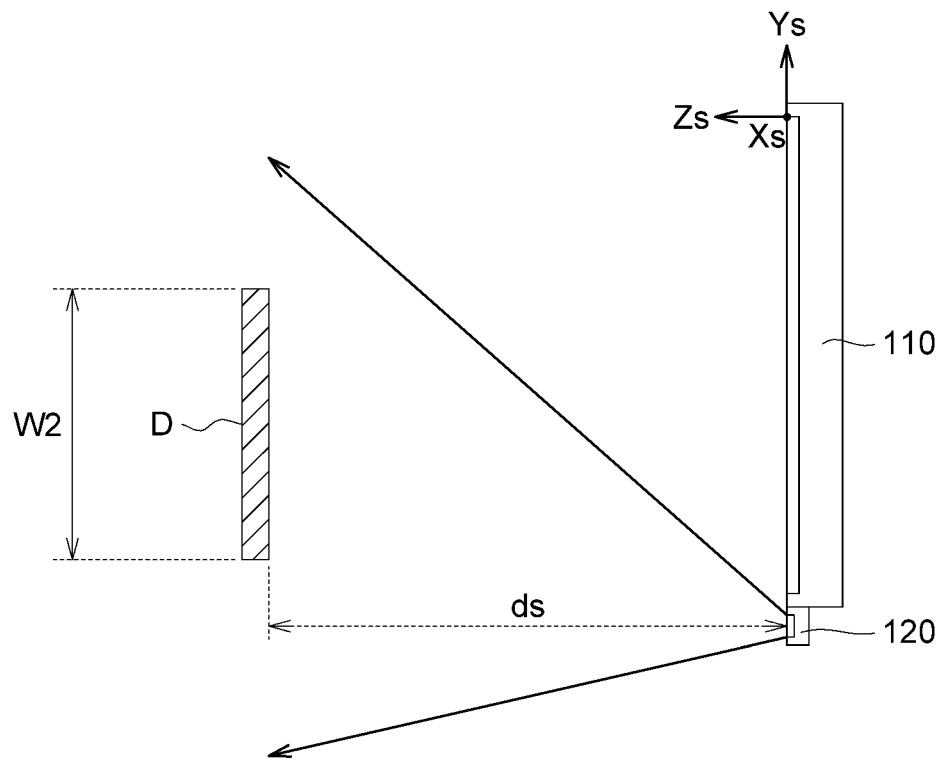
FIG. 7B is a schematic diagram of a relative position of the correction object and the camera of FIG. 7A.
Figure 7C:
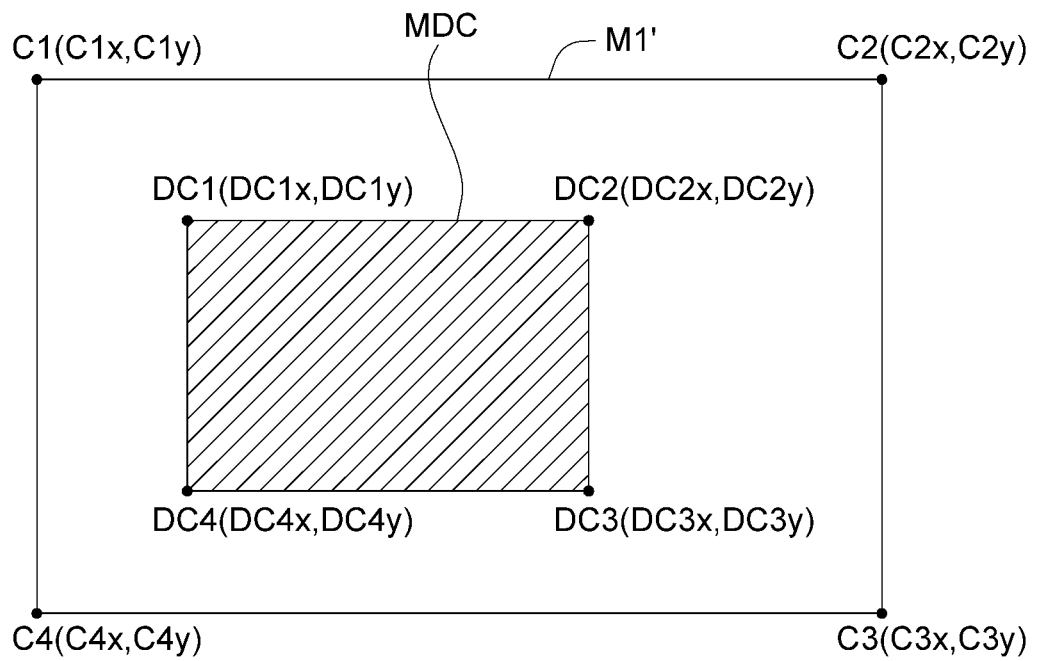
FIG. 7C is a schematic diagram of an object camera image captured by the camera of FIG. 1.
Figure 7D:
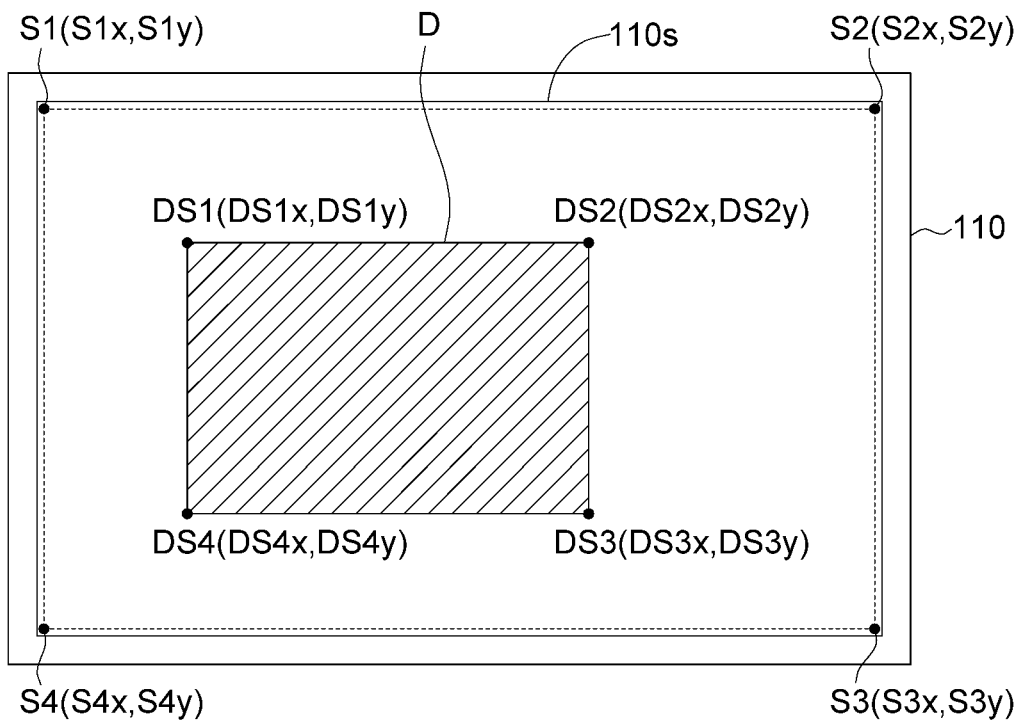
FIG. 7D is a schematic diagram of the correction object of FIG. 7A relative to the display surface of the display.

Referring to FIGS. 6 to 7D. FIG. 6 is a flow chart of obtaining the initial coordinate values of the object camera coordinate points and the initial coordinate values of the object display coordinate points according to an embodiment of the present disclosure, FIG. 7A is a schematic diagram of a correction object D according to an embodiment of the present disclosure, FIG. 7B is a schematic diagram of a relative position of the correction object D and the camera 120 of FIG. 7A, FIG. 7C is a schematic diagram of an object camera image M1' captured by the camera 120 of FIG. 1, and FIG. 7D is a schematic diagram of the correction object D of FIG. 7A relative to the display surface 110s of the display 110.

In step S210, as shown in FIG. 7B, when the correction object D is separated from the camera 120 by a correction distance ds, the camera 120 captures the object camera image M1' (the object camera image M1' is shown in FIG. 7C) of the correction object D. As shown in FIG. 7A, the correction object D has a known length W1 and width W2, wherein the length W1 could be equal to or smaller than a resolution (which is the difference between a boundary point S2 and a boundary point S1 of the display surface 110s of FIG. 7D) of the display 110 in length, and the width W2 could be equal to or smaller than a resolution (which is the difference between a boundary point S4 and a boundary point S1 of the display surface 110s of FIG. 7D) of the display 110 in width. As shown in FIG. 7C, the object camera image M1' has a number of boundary points C1 to C4. The boundary points C1 to C4 are, for example, the four corners of the object camera image M1', wherein the boundary point C1 has a coordinate value (C1x, C1y), the boundary point C2 has a coordinate value (C2x, C2y), the boundary point C3 has a coordinate value (C3x, C3y), and the boundary point C4 has coordinate values (C4x, C4y). In an embodiment, the analysis unit 150 uses one of the boundary points as the origin, for example, the boundary point C1 as the origin, and the coordinate of the origin could be defined as (0, 0).

In step S220, the analysis unit 150 obtains several object camera coordinate points DC1 to DC4 of the correction object D in the object camera image M1' from the camera 120, wherein the object camera coordinate points DC1 to DC4 are, for example, the four corners of the correction object image MDC in the object camera image M1'. The object camera coordinate point DC1 has the initial coordinate value (DC1x, DC1y), the object camera coordinate point DC2 has the initial coordinate value (DC2x, DC2y), the object camera coordinate point DC3 has the initial coordinate value (DC3x, DC3y), and the object camera coordinate point DC4 has the initial coordinate value (DC4x, DC4y). The initial coordinate values of the object camera coordinate points DC1 to DC4 are values relative to the origin (for example, the boundary point C1) of the object camera image M1'.

Since the resolution of the camera 120 is known (or given), the coordinate values (for example, (C1x, C1y), (C2x, C2y), (C3x, C3y) and (C4x, C4y)) of the boundary points C1 to C4 are also known. Since the dimensions (for example, the length W1 and the width W2) of the correction object D are known, the initial coordinate values (for example, (DC1x, DC1y), (DC2x, DC2y), (DC3x, DC3y) and (DC4x, DC4y)) of the object camera coordinate point DC1 to DC4 are also known.

In step S230, as shown in FIG. 7D, the analysis unit 150 obtains several object display coordinate points DS1 to DS4 of the correction object D relative to the display surface 110s of the display 110.

As shown in FIG. 7D, the display surface 110s has a number of the boundary points S1 to S4, wherein the boundary points S1 to S4 are, for example, four corners of the display surface 110s, the boundary point S1 has the coordinate value (S1x, S1y), and the boundary point S2 has the coordinate value (S2x, S2y), the boundary point S3 has the coordinate value (S3x, S3y), and the boundary point S4 has the coordinate value (S4x, S4y). In an embodiment, the analysis unit 150 uses one of the boundary points as the origin, for example, the boundary point S1 as the origin, and the origin is defined as (0, 0).

As shown in FIG. 7D, the object display coordinate points DS1 to DS4 are, for example, the coordinate points of the correction object D relative to the display surface 110s under Zs=0. For example, the correction object D could be disposed (or attached) on the display surface 110s of the display 110 (Zs=0). The object display coordinate points DS1 to DS4 are, for example, the four corners of the correction object D relative to the display surface 110s. The object display coordinate point DS1 has the initial coordinate value (DS1x, DS1y), the object display coordinate point DS2 has the initial coordinate value (DS2x, DS2y), the object display coordinate point DS3 has the initial coordinate value (DS3x, DS3y), and the object display coordinate point DS4 has initial coordinate values (DS4x, DS4y). The initial coordinate values of the object display coordinate points DS1 to DS4 are values relative to the origin (for example, the boundary point S1) of the display surface 110s.

Since the resolution of the display 110 is known, the coordinate values (for example, (S1x, S1y), (S2x, S2y), (S3x, S3y) and (S4x, S4y)) of the boundary points S1 to S4 are also known. Since the dimensions of the correction object D (for example, the length W1 and the width W2) are known, the initial coordinate values (for example, (DC1x, DC1y), (DC2x, DC2y), (DC3x, DC3y) and (DC4x, DC4y)) of the object camera coordinate points DC1 to DC4 are also known.

When the correction distance ds changes, the coordinate values of the object camera coordinate points DC1 to DC4 also change accordingly. When the correction object D becomes farther from the camera 120 (the correction distance ds in FIG. 7B becomes larger), for the object camera image M1' of FIG. 7C, the correction object image MDC becomes smaller, and the correction coordinate values of the object camera coordinate points DC1 to DC4 change accordingly. When the correction object D becomes closer to the camera 120 (the correction distance ds of FIG. 7B becomes smaller), the correction object image MDC of the object camera image M1' of FIG. 7 becomes larger, and the correction coordinate values of the object camera coordinate points DC1 to DC4 change accordingly.

In the present embodiment, the analysis unit 150 could obtain, under the first distance d1 (the correction distance), the initial coordinate values of the object camera coordinate points (first object camera coordinate points) DC1 to DC4 by using the aforementioned method, and the object camera coordinate points are respectively represented as (DC1$x_{d1}$, DC1$y_{d1}$), (DC2$x_{d1}$, DC2$y_{d1}$), (DC3$x_{d1}$, DC3$y_{d1}$) and (DC4$x_{d1}$, DC4$y_{d1}$), and obtain, under the second distance d2 (the correction distance), the initial coordinate values of the object camera coordinate points (second object camera coordinate point) DC1 to DC4, and the object camera coordinate points are respectively represented as (DC1$x_{d2}$, DC1$y_{d2}$), (DC2$x_{d2}$, DC2$y_{d2}$), (DC3$x_{d2}$, DC3$y_{d2}$) and (DC4$x_{d2}$, DC4$y_{d2}$).

The initial coordinate values (DC1$x_{d1}$, DC1$y_{d1}$), (DC2$x_{d1}$, DC2$y_{d1}$), (DC3$x_{d1}$, DC3$y_{d1}$) and (DC4$x_{d1}$, DC4$y_{d1}$) of the object camera coordinate points DC1 to DC4 under the first distance, the initial coordinate values (DC1$x_{d2}$, DC1$y_{d2}$), (DC2$x_{d2}$, DC2$y_{d2}$), (DC3$x_{d2}$, DC3$y_{d2}$) and (DC4$x_{d2}$, DC4$y_{d2}$) of the object camera coordinate points DC1 to DC4 under the second distance and the initial coordinate values (DS1$x$, DS1$y$), (DS2$x$, DS2$y$), (DS3$x$, DS3$y$) and (DS4$x$, DS4$y$) of the object display coordinate points could be stored in the analysis unit 150 or another storage unit (not shown) for the generation of the correction matrix H.

The procedure for obtaining the correction matrix H will be described below.

Figure 8:
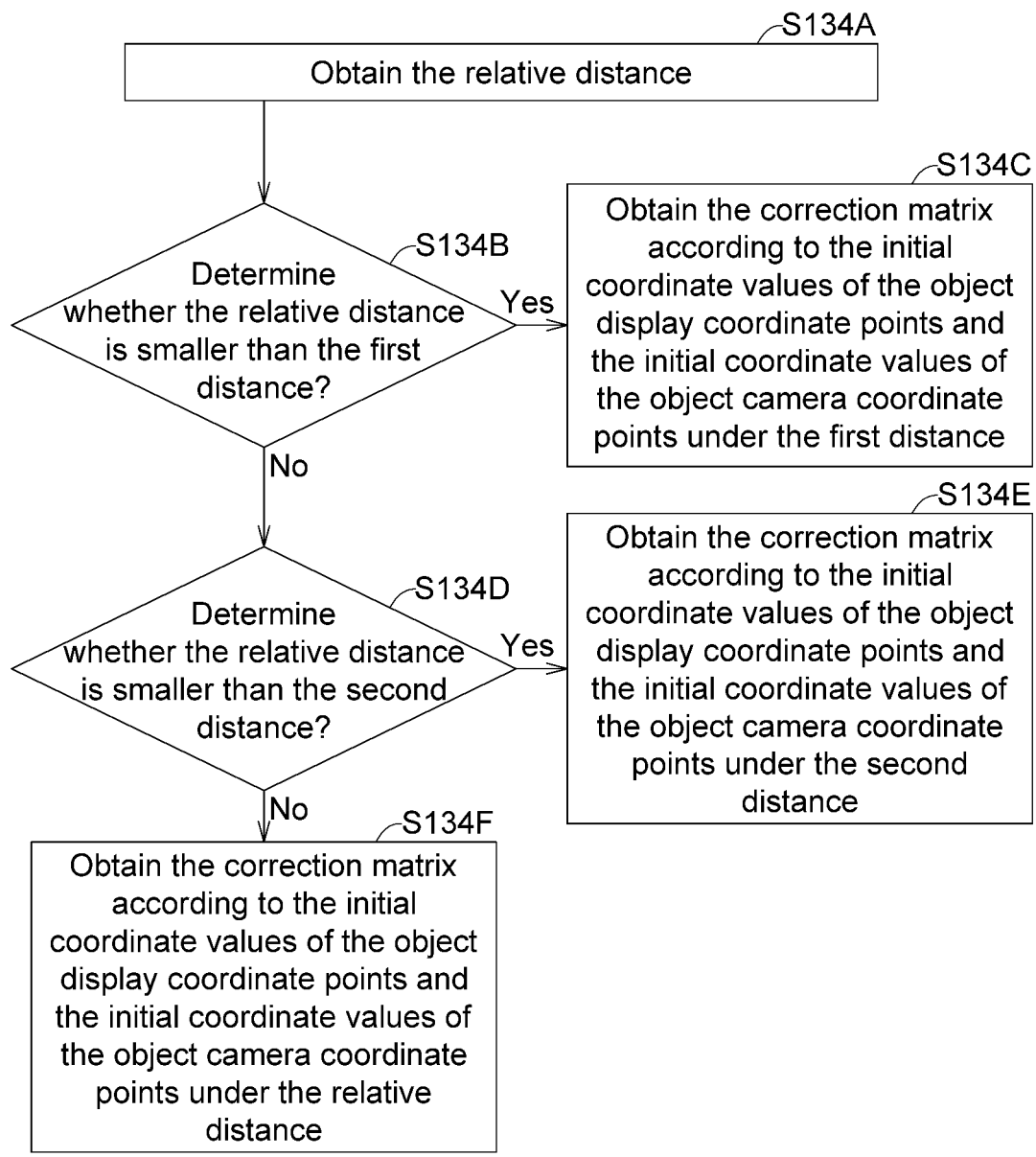
FIG. 8 is a flowchart of obtaining the correction matrix in step S134 of FIG. 4.

Referring to FIG. 8. FIG. 8 is a flowchart of obtaining the correction matrix (or "geometric correction matrix") H in step S134 of FIG. 4.

In step S134A, the camera 120 or other distance measuring (or ranging) device obtains the relative distance d between the photographed person U1 and the camera 120 (the relative distance d is shown in FIG. 3A).

In step S134B, the analysis unit 150 determines whether the relative distance d is smaller than the first distance d1. If the relative distance d is smaller than the first distance d1, the process goes to step S134C; if not, the process proceeds to step S134D. In step S134D, the analysis unit 150 determines whether the relative distance d is greater than the second distance d2. If the relative distance d is greater than the second distance d2, the process proceeds to step S134E; if not, the process proceeds to step S134F.

In step S134F, the analysis unit 150 obtains the correction matrix H according to the initial coordinate values of the object display coordinate points DS1 to DS4 and the object camera coordinate point DC1 to DC4 under the relative distance d.

$$S = \begin{bmatrix} S_x \\ S_y \\ 1 \end{bmatrix} = H \times C = \begin{bmatrix} h_{11} & h_{12} & h_{13} \\ h_{21} & h_{22} & h_{23} \\ h_{31} & h_{32} & h_{33} \end{bmatrix} \begin{bmatrix} C_x \\ C_x \\ 1 \end{bmatrix} \quad (6)$$

The values of the elements h11 to h33 of the correction matrix H in the formula (6) depend on the initial coordinate values of the object display coordinate points DS1 to DS4 and the correction coordinate values of the object camera coordinate point DC1 to DC4 under the relative distance d, not constant (non-fixed value). In the formula (6), Cx and Cy represent the coordinate values of any pixel of the to-be-analyzed image M1 (the to-be-analyzed image M1 is shown in FIG. 2). The coordinate value (Cx, Cy) of any pixel of the to-be-analyzed image M1 could be converted into the coordinate value (Sx, Sy) on the to-be-analyzed display image M2 through the correction matrix H.

An effective working area is provided between the second distance d2 and the first distance d1. Within this effective working area, the eye tracking device could generate a corresponding correction matrix according to the distance between the user and the camera, so as to increase the precision and the accuracy of eye tracking. In an embodiment, when the relative distance d is between the first distance d1 and the second distance d2, the analysis unit 150 could obtain the correction coordinate values of the object camera coordinate points DC1 to DC4 under the relative distance d by using, for example, an interpolation method or an extrapolation method. For example, the Xs-axis coordinate value x_DC$_n$ and the Ys-axis coordinate value y_DC$_n$ of the correction coordinate values (x_DC$_n$, y_DC$_n$) of the object camera coordinate points DC1 to DC4 could be obtained through the following formulas (7A) and (7B) respectively. The subscript "n" represents different object camera coordinate point. For example, the subscript "1" represents the object camera coordinate point DC1, the subscript "2" represents the object camera coordinate point DC2, and so on.

$$\text{x\_DC}_n = \left( \frac{DCnx_{,d2} - DCnx_{,d1}}{d2 - d1} \right) \times d + \quad (7A)$$
$$\left( \frac{d2 \times DCnx_{,d1} - d1 \times DCnx_{,d2}}{d2 - d1} \right), n = 1 \text{ to } 4$$

$$\text{y\_DC}_n = \left( \frac{DCny_{,d2} - DCny_{,d1}}{d2 - d1} \right) \times d + \quad (7B)$$
$$\left( \frac{d2 \times DCny_{,d1} - d1 \times DCny_{,d2}}{d2 - d1} \right), n = 1 \text{ to } 4$$

After obtaining the correction coordinate values (x_DC$_n$, y_DC$_n$) of the object camera coordinate point DC1 to DC4, the analysis unit 150 obtains the correction matrix H corresponding to the relative distance d according to the corrected coordinate values (x_DC$_n$, y_DC$_n$) of the object camera coordinate point DC1 to DC4 and the initial coordinate values of the object display coordinate points DS1 to DS4. The correction matrix H could be obtained by using the technique including, for example, a suitable mathematical method or a software function; however, such exemplification is not meant to be for limiting. In an embodiment, the correction matrix H could be obtained, for example, by using the function cv.findHomography(ptc, pts), wherein the parameter ptc represents the correction coordinate values (x_DC$_n$, y_DC$_n$) of the object camera coordinate points DC1 to DC4, and the parameter pts represents the initial coordinate values of the object display coordinate points DS1 to DS4. The function cv.findHomography could obtain or generate the transformation matrix between two planes, but as long as the transformation matrix between the two planes could be obtained, it is not limited to using the function cv.findHomography.

In step S134C, due to the relative distanced being smaller than the first distance d1, regardless of the difference between the relative distance d and the first distance d1, the analysis unit 150 sets the value of the relative distance d as the value of the first distance d1 and obtains (or generates) the correction matrix H by using the method same as or similar to step S134F. In step S134E, due to the relative distance d being greater than the second distance d2, regardless of the difference between the relative distance d and the second distance d2, the analysis unit 150 sets the value of the relative distance d as the value of the second distance d2, and obtains (or generates) the correction matrix H by using the method same as or similar to step S134F.

As shown in the above formula (6), the coordinate value (Cx, Cy) of any pixel of the to-be-analyzed image M1 (shown in FIG. 2) is converted into the coordinate value (Sx, Sy) on the to-be-analyzed display image M2 through the correction matrix H, and thus the to-be-analyzed facial image presented by the to-be-analyzed display image M2 (shown in FIG. 3C) of the display 110 does not change with the change of the relative distance d. Furthermore, even if the relative distance d increases or decreases, the to-be-analyzed facial image in the display image M2 displayed on the display 110 could remain substantially unchanged.

In addition, based on the property of the camera 120, the to-be-analyzed image M1 (shown in FIG. 2) is inevitably deformed (for example, a trapezoid with a narrow top and a wide bottom). However, through the correction of the correction matrix H in the disclosed embodiment, the four coordinate points DC5 to DC8 (the coordinate points DC5 to DC8 are shown in FIG. 2) of a region R1 (the region R1 is shown in FIG. 2) of the deformed to-be-analyzed image M1 could be converted to the four coordinate points DS5 to DS8 (the coordinate points DS5 to DS8 are shown in FIG. 3B) of a region R2 (the region R2 is shown in FIG. 3C) of the to-be-analyzed display image M2, wherein the region R1 could be a trapezoid, and the region R2 could be a rectangle. The coordinate points DC5 to DC8 are, for example, the four corners of the region R1, and the coordinate points DS5 to DS8 are, for example, the four corners of the region R2. As long as an appropriate position of the region R1 is selected, the corresponding region R2 could be the size of the entire display surface of the display 110. As shown in FIGS. 2 and 3C, in the present embodiment, the area R1 is smaller than the area R2, and thus another photographer located in the area other than the area R1 of the to-be-analyzed image M1 will not be displayed on the to-be-analyzed display image M2. However, even if another photographer located in the area other than the area R1 of the to-be-analyzed image M1 will not be displayed on the to-be-analyzed display image M2, the gaze tracking device 100 could still analyze the to-be-analyzed facial image outside the area R1 by using the method same as or similar to that of the to-be-analyzed facial image MF1, and it will not be repeated here.

Tables 1 to 4 below are the property comparison table showing the precision and the accuracy for the head swing of the tested subject (dummy) based on the eye tracking device 100 using the customized 3D face model in the present disclosure and the eye tracking device using the conventional 3D face model. The better the precision and accuracy performance is, the more accurate and precise the gaze projection point $V_g$ is.

TABLE 1

| | Test without a mask | | | |
|---|---|---|---|---|
| | Conventional 3D face model | | Customized 3D face model | |
| | Left-and-right (Yaw, degrees) | Up-and-down (Pitch, degrees) | Left-and-right (Yaw, degrees) | Up-and-down (Pitch, degrees) |
| Individual accuracy | 0.65 | 0.72 | 0.1 | 0.12 |
| Integration accuracy | 0.96 | | 0.15 | |

TABLE 2

| | Test with a mask | | | |
|---|---|---|---|---|
| | Conventional 3D face model | | Customized 3D face model | |
| | Left-and-right (Yaw, degrees) | Up-and-down (Pitch, degrees) | Left-and-right (Yaw, degrees) | Up-and-down (Pitch, degrees) |
| Individual accuracy | 1.37 | 1.76 | 0.52 | 0.49 |
| Integration accuracy | 2.23 | | 0.72 | |

TABLE 3

| Model for accuracy test | Accuracy test (unit: degree) | | | | |
|---|---|---|---|---|---|
| | middle | left | right | up | down |
| Conventional 3D face model | 1.79 | 1.9 | 1.45 | 1.5 | 1.73 |
| Customized 3D face model | 0.25 | 0.32 | 0.28 | 0.21 | 0.25 |

TABLE 4

| model for precision test | precision test (unit: degree) | | | | |
|---|---|---|---|---|---|
| | middle | left | right | up | down |
| conventional 3D face model | 0 | 2.4 | 2.97 | 0.68 | 0.51 |
| customized 3D face model | 0 | 0.76 | 1.02 | 0.26 | 0.23 |

As shown in Table 1 above, according to the test results on the premise of not wearing the mask, in comparison to using the conventional 3D face model, the gaze tracking device 100 of the embodiment of the present disclosure has the higher individual accuracy in the left-and-right direction, the higher individual accuracy in the up-and-down direction and the higher Integration accuracy based on the customized 3D face model.

As shown in Table 2 above, according to the test results on the premise of wearing the mask, in comparison to using the conventional 3D face model, the gaze tracking device 100 of the embodiment of the present disclosure has the higher individual accuracy in the left-and-right direction, the higher individual accuracy in the up-and-down direction and the higher Integration accuracy based on the customized 3D face model.

As shown in Table 3 above, according to the results of the accuracy test (the accuracy detected under the test dummy moving up and down by 1 degree and swinging by 3 degrees left and right), in comparison to using the conventional 3D face model, the gaze tracking device 100 of the embodiment of the present disclosure has the higher accuracy in middle point, the left point, the right point, the up point (upper point) and the down point (lower point), wherein the left point, the right point, the up point and the down point are respectively relative to a center point, and the center point does not limit the position in the dummy's face.

As shown in Table 4 above, according to the results of the precision test (the precision detected under the test dummy moving up and down by 1 degree and swinging by 3 degrees left and right), in comparison to using the conventional 3D face model, the gaze tracking device 100 of the embodiment of the present disclosure has the higher precision in middle point, the left point, the right point, the up point (upper point) and the down point (lower point), wherein the left point, the right point, the up point and the down point are respectively relative to a center point, and the center point does not limit the position in the dummy's face.

To sum up, the embodiments of the present disclosure provide a gaze tracking device and a gaze tracking method thereof. The gaze tracking device could determine whether the photographed person has created the customized 3D face model exclusive to the photographed person. If so, the photographed person's gaze is tracked based on the customized 3D face model. If not, the customized 3D face model exclusive to the photographed person is established. Due to the established customized 3D face model being exclusive to the photographed person, the gaze tracking device could obtain the accurate and precise head posture information of the photographed person for obtaining the accurate and precise gaze projection point.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A gaze tracking device, comprising:
   a display;
   a camera, disposed on the display, and configured for capturing a to-be-analyzed image, wherein the to-be-analyzed image comprises a to-be-analyzed facial image of a face of a photographed person;
   a determination unit configured for determining whether the to-be-analyzed facial image of the to-be-analyzed image conforms to a customized 3D face model;
   a modeling unit configured for establishing the customized 3D face model of the to-be-analyzed facial image through a customized 3D face modeling process if the to-be-analyzed facial image of the to-be-analyzed image does not conform to the customized 3D face model; and
   an analysis unit configured for:
      obtaining an eye region image of the to-be-analyzed facial image if the to-be-analyzed facial image of the to-be-analyzed image conforms to the customized 3D face model;
      obtaining a head posture information of a head of the photographed person according to the customized 3D face model and the to-be-analyzed facial image;
      obtaining an eye camera coordinate value of an eye characteristic point of the eye region image, wherein the eye camera coordinate value is referenced to a camera coordinate system;
      converting the eye camera coordinate value into an eye frame coordinate value, wherein the eye frame coordinate value is referenced to a display frame coordinate system;
      obtaining an eyeball center point coordinate value of the photographed person according to the eye frame coordinate value, the head posture information and an eyeball radius; and
      obtaining a gaze projection point coordinate value of the photographed person according to the eye frame coordinate value and the eyeball center point coordinate value.

2. The gaze tracking device according to claim 1, wherein the modeling unit is further configured for:

obtaining a plurality of modeling characteristic points of the to-be-analyzed facial image;
adjusting a coordinate value of a reference one of the modeling characteristic points into a reference coordinate value;
normalizing a coordinate value of each of the others of the modeling characteristic points according to the reference coordinate value;
adjusting the coordinate value of each of the normalized the modeling characteristic points into a modeling coordinate value according to an adjustment factor; and
storing the reference coordinate value and the modeling coordinate values.

3. The gaze tracking device of claim 2, wherein the modeling unit is further configured for:
obtaining the corresponding adjustment factor according to a relative distance between the photographed person and the display.

4. The gaze tracking device according to claim 3, wherein value of the adjustment factor is proportional to the relative distance.

5. The gaze tracking device according to claim 1, wherein the head posture information comprises an up-and-down tilt angle and a left-and-right tilt angle of the head, wherein the up-and-down tilt angle is an included angle of the head relative to a horizontal axis, and the left-and-right tilt angle is an included angle of the head relative to a vertical axis.

6. The gaze tracking device of claim 1, wherein the eye characteristic point comprises a pupil center point and an eye center point.

7. The gaze tracking device according to claim 1, wherein the analysis unit is further configured for:
obtaining a corresponding correction matrix according to a relative distance between the photographed person and the camera; and
converting the eye camera coordinate value into the eye frame coordinate value according to the correction matrix.

8. The gaze tracking device according to claim 1, wherein the analysis unit is further configured for:
under a first distance, obtaining a plurality of first object camera coordinate points of an correction object in an object camera image from the camera;
under a second distance, obtaining a plurality of second object camera coordinate points of the correction object in the object camera image from the camera;
obtaining a plurality of object display coordinate points of the correction object relative to a display surface of the display; and
storing the first object camera coordinate points, the second object camera coordinate points and the object display coordinate points.

9. The gaze tracking device according to claim 8, wherein the analysis unit is further configured for:
obtaining a relative distance;
determining whether the relative distance is between the first distance and the second distance; and
obtaining a correction matrix according to the first object camera coordinate points, the second object camera coordinate points and the object display coordinate points if the relative distance is between the first distance and the second distance.

10. A gaze tracking method, comprising:
capturing, by a camera, a to-be-analyzed image, wherein the to-be-analyzed image comprises a to-be-analyzed facial image of a face of a photographed person;

determining whether the to-be-analyzed facial image of the to-be-analyzed image conforms to a customized 3D face model;

establishing the customized 3D face model of the to-be-analyzed facial image through a customized 3D face modeling process if the to-be-analyzed facial image of the to-be-analyzed image does not conform to the customized 3D face model;

obtaining an eye region image of the to-be-analyzed facial image if the to-be-analyzed facial image of the to-be-analyzed image conforms to the customized 3D face model;

obtaining a head posture information of a head of the photographed person according to the customized 3D face model and the to-be-analyzed facial image;

obtaining an eye camera coordinate value of an eye characteristic point of the eye region image, wherein the eye camera coordinate value is referenced to a camera coordinate system;

converting the eye camera coordinate value into an eye frame coordinate value, wherein the eye frame coordinate value is referenced to a display frame coordinate system;

obtaining an eyeball center point coordinate value of the photographed person according to the eye frame coordinate value, the head posture information and an eyeball radius; and obtaining a gaze projection point coordinate value of the photographed person according to the eye frame coordinate value and the eyeball center point coordinate value.

11. The gaze tracking method according to claim 10, wherein the customized 3D face modeling process comprises:

obtaining a plurality of modeling characteristic points of the to-be-analyzed facial image;

adjusting a coordinate value of a reference one of the modeling characteristic points into a reference coordinate value;

normalizing a coordinate value of each of the others of the modeling characteristic points according to the reference coordinate value;

adjusting the coordinate value of each of the normalized the modeling characteristic points into a modeling coordinate value according to an adjustment factor; and storing the reference coordinate value and the modeling coordinate values.

12. The gaze tracking method according to claim 11, wherein the customized 3D face modeling process comprises:

obtaining the corresponding adjustment factor according to a relative distance between the photographed person and the display.

13. The gaze tracking method according to claim 12, wherein value of the adjustment factor is proportional to the relative distance.

14. The gaze tracking method according to claim 10, in step of obtaining the head posture information of the head of the photographed person, the head posture information comprises an up-and-down tilt angle and a left-and-right tilt angle of the head, wherein the up-and-down tilt angle is an included angle of the head relative to a horizontal axis, and the left-and-right tilt angle is an included angle of the head relative to a vertical axis.

15. The eye tracking method according to claim 10, in step of obtaining the eye camera coordinate value of the eye characteristic point of the eye region image, the eye characteristic point comprises a pupil center point and an eye center point.

16. The eye tracking method according to claim 10, wherein step of converting the eye camera coordinate value into the eye frame coordinate value comprises:

obtaining a corresponding correction matrix according to a relative distance between the photographed person and the camera; and converting the eye camera coordinate value into the eye frame coordinate value according to the correction matrix.

17. The gaze tracking method according to claim 10, further comprising:

under a first distance, obtaining a plurality of first object camera coordinate points of an correction object in an object camera image from the camera;

under a second distance, obtaining a plurality of second object camera coordinate points of the correction object in the object camera image from the camera;

obtaining a plurality of object display coordinate points of the correction object relative to a display surface of the display; and storing the first object camera coordinate points, the second object camera coordinate points and the object display coordinate points.

18. The gaze tracking method according to claim 17, further comprising:

obtaining a relative distance;

determining whether the relative distance is between the first distance and the second distance; and obtaining a correction matrix according to the first object camera coordinate points, the second object camera coordinate points and the object display coordinate points if the relative distance is between the first distance and the second distance.

* * * * *